United States Patent [19]

Schloemer

[11] Patent Number: 5,722,082
[45] Date of Patent: Feb. 24, 1998

[54] DECENTRALIZED RADIO COMMUNICATION SYSTEM AND METHOD FOR ASSIGNING CHANNELS WITH A MINIMUM OF SIGNALING BETWEEN REMOTES AND BASES

[76] Inventor: Jerry R. Schloemer, P.O. Box 307, Round Lake, Ill. 60073

[21] Appl. No.: 510,379

[22] Filed: Aug. 2, 1995

Related U.S. Application Data

[63] Continuation-in-part of Ser. No. 976,535, Nov. 16, 1992, abandoned, and Ser. No. 276,781, Jul. 18, 1994, abandoned.

[51] Int. Cl.$^6$ ............................................ H04Q 7/38
[52] U.S. Cl. ........................ 455/509; 455/524; 455/62; 455/67.1
[58] Field of Search ...................... 455/33.1, 33.4, 455/34.1, 34.2, 53.1, 54.1, 54.2, 56.1, 62, 63, 67.1, 446, 447, 450–452, 509, 516, 524; 519/58–60

[56] References Cited

U.S. PATENT DOCUMENTS

| | | | |
|---|---|---|---|
| 4,965,850 | 10/1990 | Schloemer | 455/33.1 |
| 5,101,503 | 3/1992 | Furuya | 455/34.1 |
| 5,203,008 | 4/1993 | Yasuda et al. | 455/33.1 |
| 5,239,676 | 8/1993 | Strawczynski | 455/33.2 |

*Primary Examiner*—Chi H. Pham
*Attorney, Agent, or Firm*—Leo J. Abel

[57] ABSTRACT

In a radio telephone communications system comprising bases and mobile units, a method of making communications channel assignments to mobile units wherein at least three signal-to-interference determinations are made in making the communications channel assignments to mobile units seeking to enter the system to begin communications, and wherein there are no signaling channels for making communication channel assignments; signaling for assigning communications channels being done only via the communications channels.

9 Claims, 5 Drawing Sheets

PRIOR ART

Fig 1

PRIOR ART

DECENTRALIZED RADIO COMMUNICATION SYSTEM AND METHOD FOR ASSIGNING CHANNELS WITH A MINIMUM OF SIGNALING BETWEEN REMOTES AND BASES

BACKGROUND OF INVENTION

This application is a continuation-in-part of U.S. patent application Ser. No. 07/976,535 filed on Nov. 16, 1992, now abandoned, and a continuation-in-part of U.S. patent application Ser. No. 08/276/781 filed on Jul. 18, 1994, all under the name of the same inventor, herein.

This invention is related to U.S. Pat. No. 4,965,850 entitled System For And Method Of Assigning Frequencies In A Communications System With No Central Control Of Frequency Allocation, which issued on Oct. 23, 1990 to Jerry R. Schloemer, also the inventor of the present invention. U.S. Pat. No. 4,965,850 is incorporated herein by specific reference thereto.

U.S. Pat. No. 4,965,850 is directed to a system for and method of assigning frequencies (channels) in a radio telephone system without central computer controlled frequency assignment and which assignment was also not dependent upon preplanned geographical separation of users who share the same channel. The method and system of U.S. Pat. No. 4,965,850 provided a much greater utilization of the radio spectrum. U.S. Pat. No. 4,965,850 described how many decentralized users could share a common radio band without the destructive interference that occured in many systems such as Citizens Band Radio, High Band Business Radio, and Cordless Telephone.

In the method and system of U.S. Pat. No. 4,965,850 mobile users were usually assigned to the closest base. A radio telephone user would travel around through the service area and would be automatically assigned to the closest base. Users were not preassigned to a specific base. U.S. Pat. No. 4,965,850 also noted the following questions that were to be answered in order to insure interference free assignments when assigning a new user pair comprising a base and associated mobile to the system.

a) Will the new base cause interference at a previously assigned mobile?
b) Will the new mobile be interfered with by a previously assigned base?
c) Will the new mobile cause interference at a previously assigned base?
d) Will the new base be interfered with by a previously assigned mobile?

Figure 2:
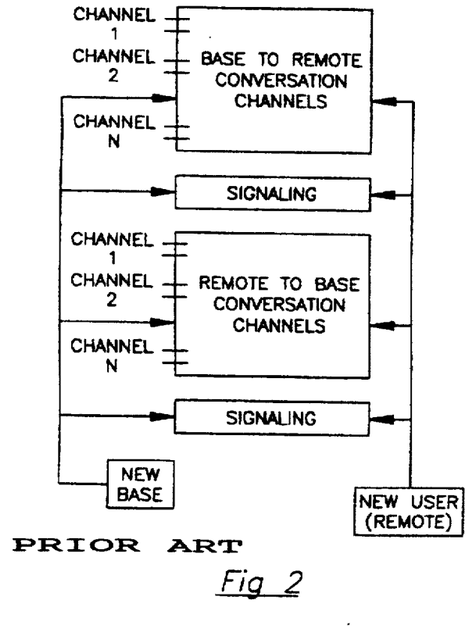
FIG. 2 is a drawing useful in explaining the frequency allocation plan for the system and method of U.S. Pat. No. 4,965,850.
Figure 4:
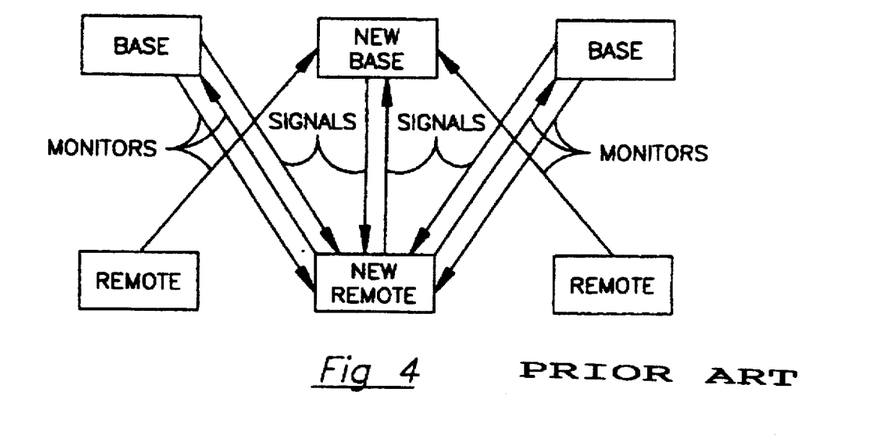
FIG. 4 is a drawing useful in explaining the signaling in the system and method of U.S. Pat. No. 4,965,850.

In U.S. Pat. No. 4,965,850 a series of tests were described that answered the foregoing questions and permitted interference free assignments of the new user pair. The tests were performed by communication between the new user pair and various preassigned users on both the intended communication channels and a common signaling channel. FIG. 2 herein shows a diagram of the frequency usage plan for U.S. Pat. No. 4,965,850; and, FIG. 4 shows a diagram of the various communications that had to occur to establish a channel assignment in U.S. Pat. No. 4,965,850.

SUMMARY OF INVENTION

The present invention discloses an improved method and system of assigning new user pairs and updating assignments in a decentralized communications system by a series of unique steps that assure interference free assignments.

The present invention is an improvement over the method and system described in U.S. Pat. No. 4,965,850 in that it simplifies the frequency allocation plan, and it also reduces the amount of communication required to establish an interference free assignment.

DRAWINGS

The foregoing features and advantages of the present invention will be apparent from the following more particular description of the invention. The accompanying drawings, listed hereinbelow, are used in explaining the invention.

DESCRIPTION OF THE INVENTION

FM (frequency modulation) radio systems have a capture feature such that when a desired stronger signal exceeds an undesired signal by some amount, the user hears only the stronger signal. This difference is usually measured in dbs (decibels) and is expressed as a ratio between desired and undesired signals. The ratio is usually expressed as a ratio of desired signal to interference signal strengths, frequently called "S/I". In FM systems, the FM deviation or degree of modulation has an impact on the capture ratio which is usually between 10 and 15 db in most normal systems. Generally, it is assumed 15 db is needed to capture for purposes of this invention. In addition to the 15 db required to capture, a safety factor is required. Remotes might change their geographical position, and this would change the various desired and undesired signal strengths present in the system. Consequently, an additional 10 db is added to the 15 db required to capture to total 25 db required for assignment.

The terms "remotes" and "mobiles" refer to the radio telephone users who would normally move or travel about. The term "bases" refers to the stationary network of radios that provides communications service to and from the remotes.

In a preferred embodiment, the present system utilizes conventional FM modulation. However, the method of the invention may be used for other types of modulations such as time division multiplexing or amplitude modulation. In systems utlilizing time division multiplexing the audio signal is first digitized, and then the digitized signal is placed into a series of time slots, and then a modulation such as frequency shift keying or phase shift keying is used. By interleaving several digitized audio signals on a single channel, it is possible to transmit several voice conversations on a single channel at the same time. Both frequency shift keying and phase shift keying modulations experience a capture effect closely related to the FM capture effect. In a system using time division multiplexing each time slot on a channel is logically treated as a channel in the inventive method. In a system using amplitude modulation, the capture feature is not present, and a much larger S/I safety factor is needed for interference free assignment. In various computer data systems frequency shift keying and phase shift keying modulations are used without time division multiplexing, and these also experience a closely related capture effect.

The system of the invention is a full duplex system and each channel communication pair includes a talk out channel (base transmission to a remote receiver) and a corresponding talk back channel (remote transmission to a base receiver) in a different radio frequency band. The bands are spread sufficiently apart from each other for full duplex operation.

In any ongoing communications, the received signal strength is noted by the base receiver, and a digital data stream code (DDSC) is continuously added to the base's transmission corresponding to the strength of the desired signal:

| Signal Strength | DDSC |
| --- | --- |
| 0 to 5 DB | 0001 |
| 5 to 10 DB | 0010 |
| 10 to 15 DB | 0011 |
| 15 to 20 DB | 0100 |
| Etc. | |

Because of reciprocity of signal paths, the remote is receiving a signal of approximately the same strength as the base and it consequently adds or copies the same signal strength code to its communications. In the present system the digital data stream code is used in making interference free assignments. Thus it is the base that makes the measurement to add the particular signal strength code which is then copied by the remote.

In the inventive communications system, the remotes or mobiles transmit only about 250 milliwatts of power. Transmission of higher powers would either decrease battery life or require a heavier battery. Naturally, greater power would give greater range to the remotes, and greater power would give better signal quality at the base site receiver. This increase in power gives better system performance against unwanted noise sources such as vacuum cleaner noise, spark plug ignition noise, and other unwanted noise sources. However, increasing the power level of all users does not change S/I for the entire system, and does not reduce any interference caused by other system users. Note that the base sites do have access to standard electrical sources, and their power is not battery limited, and the base sites transmit at about one (1) watt of power. This extra power permits the remotes to hear a better signal.

In the inventive communications system, the remote units do not have a large high gain antenna, since the remote user normally can not carry around a large apparatus. The base site is not movable, and it has a gain antenna for both the transmitting and receiving of signals. This gain antenna system improves the signal quality for the base talk out, and especially for the limited power remote talk back situation. Summarizing the results for the inventive system, it is seen that signal paths have approximately the same loss for the talk out channel and for the talk back channel. There is a gain antenna at the base site for both paths, and there is no gain antenna at the remote for either path. The signal at the remote receiver is thus some 6 db (6 db corresponding to a fourfold increase in power from 250 milliwatts to one watt) better than at the base receiver because of the increased transmitting power of the base sites.

Note that in the existing cellular radio systems in the United States, a code is added that corresponds to signal quality. This code helps control interference. However such a cellular code is only useful after degradation of the signal for any reason has begun to occur. The cellular code does not prevent poor assignments, but only discovers poor assignments after they have been made. After discovering such a poor assignment, the cellular system tries another assignment. Thus in contrast to the prior art, the present invention assures an interference free assignment, initially.

In typical full duplex communications system, and in the inventive system, channels are normally paired. One group of channels are used for base talk out, and another group of channels are used for remote talk back. For each base talk out channel there is a corresponding remote talk back channel in the other band. In today's cellular system, for example, all the remotes transmit on one radio band, and listen on the other radio band. The base sites, however, have their radios transmit on the band that the remotes use for receiving. Consequently, in cellular and in the inventive system, it is not possible for two remotes to talk directly to each other, and it is not possible for two bases to talk directly to each other. For example, it is not possible for two remotes to talk directly to each other, because the receivers of both remotes listen on the same band while both of the transmitters of the remotes talk on the other band.

For purposes of thie invention all of the assigned communications and pre-communications signaling occur such that each of the remotes need only one band to transmit, and only one band to receive. Each band includes a number of frequency channels. Each of the base sites need only one band to transmit and one band to receive. The band assignments are reversed between the remotes and the bases. The bases transmit on the remote receive band. The remotes transmit on the base receive band.

In a first embodiment of the invention, only the remotes can originate communications. If any phone in the system or outside the system desires to communicate with a remote, that phone pages the remote by conventional paging technology on another channel not per se part of the present system, and indicates to the remote that the remote has a call waiting for it. Each remote has built in components that function in a manner comparable to the pagers in common use today. If for example a landline phone desires to contact a remote user, the land line phone dials the city wide central paging system, and the paging system broadcasts the phone number of the land line user and the paging code of the remote on the dedicated paging channel to the remotes. The remote user in question hears the page and records the number of the calling party, and then proceeds to initiate a call. Consequently, whether the remote wants to originate communications, or whether the remote is responding to a page indicating that it must respond, the system operates the same way in that the remote initiates the logical process of setting up of an interference free call.

The sequence of the operation of the call set up procedure of the system will now be explained.

Figure 1:
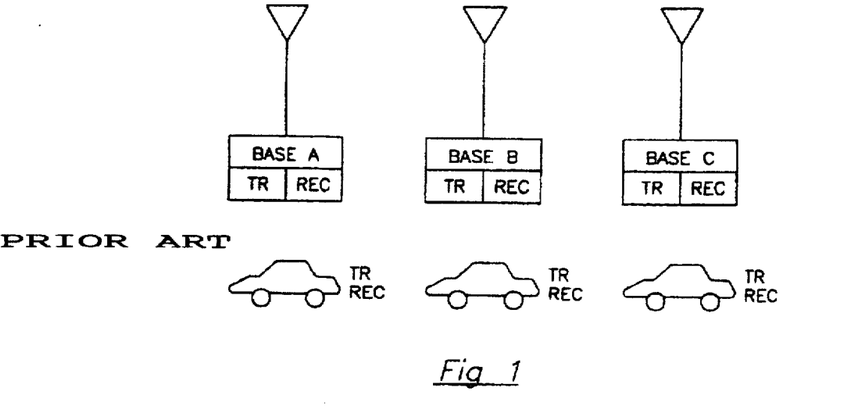
FIG. 1 is a drawing useful in explaining the system and method of U.S. Pat. No. 4,965,850 and also useful for explaining the new inventive system and method.

Step 1. In FIG. 1, all the bases A,B, ... N are continuously monitoring the various channel communications signal pairs, and searching for channels that appear to be available. The bases only actually listen on the remote talk back channels. Bases can not hear other bases, but can only hear remotes. Bases hear only remotes that are within range. Remotes that are so distant that their signals arrive below threshold and below the background noise level are not heard.

This searching process is accomplished by the bases A,B ... n randomly transmitting their unique identification code only on those channels where the transmission would not interfere with an existing conversation at a remote receiver. This ID is a short transmission that takes minimal time and thus permits other bases to also transmit bursts on the same channel at different times. This transmission occurs at a random time. Because the bursts are of relatively short duration, there are relatively few instances where two bursts occur at the same time causing signal collisions. However, when collisions do occur, this does not not interrupt the entire signaling and call set up process, as the remote is not able to decipher the result of the collision, and the transmission will be ignored.

Each base site has one or more radios. A radio is considered a pair of transmitting and receiving units. In geographical areas where very few calls are anticipated, each base site would have only one radio. In geographical areas where several simultaneous calls are expected, each base site would have several radios. Only one radio per base site participates in this signaling process. This participating radio searches upwards through the frequency channels for the channels that appear to be open. When the participating radio reaches the highest channel in that band, the radio then commences to begin the process again at the lowest channel in the band. This short transmission is at the same signal strength that would be used for subsequent transmission.

The decision whether to transmit on a tentative selected channel is accomplished by monitoring the signal on the corresponding talk back channel in the tentative channel pair and sensing the signal strength code signal present in that channel pair. The base then calculates whether its transmission on the corresponding talk out channel of the tentative channel pair would interfere with the previously assigned remotes receiver.

Figure 8:
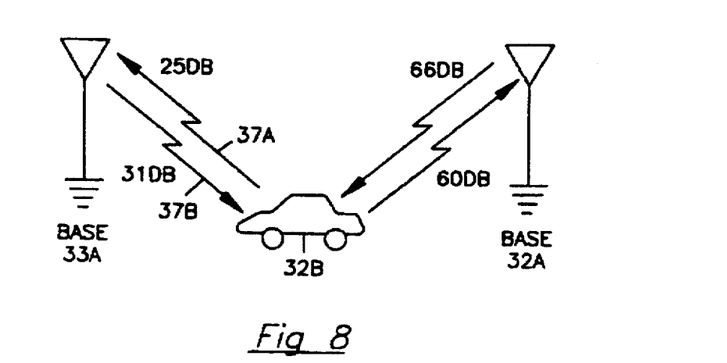
FIG. 8 is a drawing useful in explaining the calculations for step 1 of the inventive method.

For example, in FIG. 8 user pair (base and remote) 32A and 32B are already in the process of communicating between themselves. They are communicating on channel pair number 5. In FIG. 8 base 33A is in the process of looking for an open channel. In the searching process, base 33A arrives at channel number 5. Base 33A hears a signal via path 37A from the previously assigned user pair 32A and 32B arriving on the tentative channel remote talk back channel number 5 at 25 DB over threshold (noise level reference, or minimum signal that could be heard). The base 33A has no way of knowing whether its potential transmission on path 37B would interfere with the previously assigned remote 32B at the remote's 32B receiver. The base calculates by reciprocity that if it transmitted on the corresponding base talk out channel, that its signal would arrive at the previously assigned remote at the same 25 DB over threshold.

Actually, as mentioned above there is only approximate reciprocity in the signal paths. The output power of the remote is different from the output power of the base, and an adjustment in the calculations should be made as explained below. If different antennas are used for transmitting and receiving, additional adjustments should be made in a corresponding manner.

If the previously assigned users 32A and 32B were in communication with their signals going back and forth with a code added corresponding to 60 db over threshold, the new or proposed base 33A would observe the digital data stream present in path 37A, and note that the previously assigned users were having good communications, and know that its transmissions on that channel would not interfere the previously assigned users, and that it could conduct transmissions on that channel. The 60 db desired signals can easily override the weaker 25 db undesired signal.

A method of making the calculations for the example in FIG. 8 includes the different power levels being transmitted by the remotes and the bases. The bases transmit 6 db more power (1 watt as compared to 250 milliwatts) as previously discussed. The following is calculated:

60 db—observed from the signal strength code originated by base 32A and copied by remote 32B and heard by base 33A in propagation path 37A.

+6 db—additional power received at the remote 32B because base 32A transmits 6 DB more power.

66 db—total actual communicating signal received at remote 32B

---

25 db received signal at base 33A from remote 32B
+6 db extra that base 33A would transmit to remote 32B 31 db Signal base 33A would send to remote 32B if base 33A transmitted

---

The results of the two above calculations are processed as follows:

---

66 db    actual desired signal at remote 32B
−31 db    proposed undesired signal at remote 32B 35 db    difference at remote 32B in signal strengths of desired and undesired signals

---

Because 15 db is needed to capture, and a 10 db safety factor is needed a total 25 db is needed. This 35 db difference is sufficient such that the base 33A would not interfere with the previously assigned remote 32B at the remote's receiver.

Figure 9:
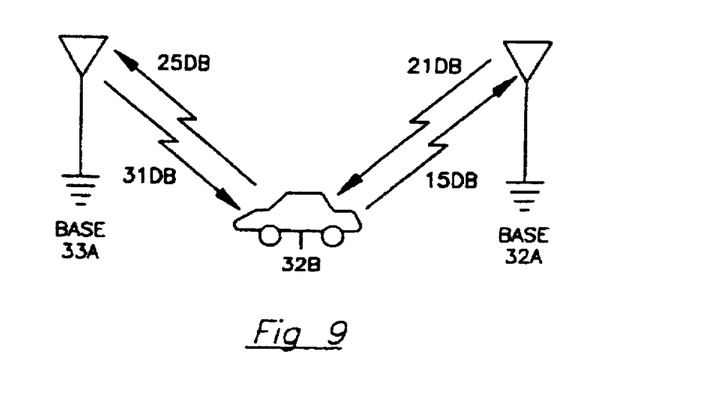
FIG. 9 is a drawing useful in explaining calculations for step 1 of the inventive method in another situation.

Refer to FIG. 9. If, however, the previously assigned users 32A and 32B were having poor communications, and were only receiving signals between themselves at 15 db over threshold, the new base would know that it would interfere with the previously assigned users, and would not attempt to transmit on that channel. The calculations are as follows:

---

15 db    desired signal per code originated at base 32A and copied by 32B and heard by base 33A.
+6 db    added power transmitted by base 32A 21 db    desired signal at remote 32B
25 db    proposed undesired signal determined by reciprocity at 32B
+6 db    for added power by base 33A 31 db    actual proposed undesired signal at 32B
21 db    desired signal at remote receiver 32B
−31 db    undesired proposed signal −10 db    of signal difference

---

Since 25 db is required to make a satisfactory assignment, the above difference of minus db is not sufficient, and good communications would not occur. Consequently, the base can not choose this tentative channel pair for transmission.

Figure 5:
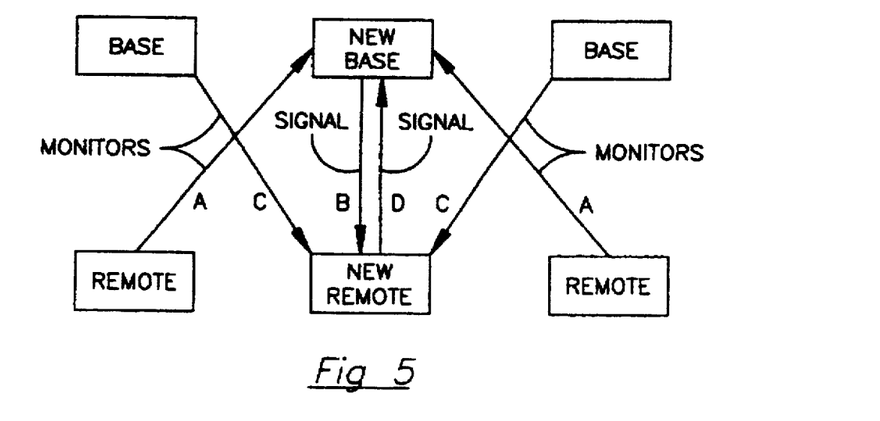
FIG. 5 shows the various communications paths that must be utilized for the inventive system.

Refer now to FIG. 5. In FIG. 5 this calculation required only a monitoring of the communications being transmitted by a previously assigned remote. This communication is indicated by the monitor arrows A. The result is a signal B in FIG. 5 being transmitted by any/all bases indicating that a particular channel pair has satisfactorily answered the first interference question. If the base can not transmit on a specific channel, the base continues to search and transmit on other channels.

Therefore, Step 1 insures that the any/all bases will not cause interference at a previously assigned remote.

Step 2. The second step is as follows. Any remote desiring to commence communications, that is an incoming remote, scans the available channels starting at the highest channel and working down to the lowest channels. The remote scans the available channels slowly such that the bases complete one scan of the entire band while the remote monitors just one channel. When the remote desiring communications arrives at the lowest channel, it commences again to scan from the highest channel down. The new remote hears both signaling from open bases and also hears various conversations in process. Although there are instances where assignments possibly could be made when the received undesired communications are 45 db over threshold, the new remote avoids those channels instantly where it notes communications in progress that arrive at its receiver at over 45 db over threshold.

The new (incoming) remote monitors the short bursts and their associated codes and ignores the various communications. The new remote hears the short bursts from the various bases on the proposed tentative channel. The new remote measures the signal strength of the short bursts. The new remote chooses the strongest signal burst as its tentative base on that proposed tentative channel. This corresponds to arrow B in FIG. 5. During the quiet time between the bursts, the new remote also hears any undesired signals from other bases. These undesired signals are the actual communications being transmitted by other bases. The new remote measures the strength of the undesired signals on the tentative channel. The new remote listens only on the base talk out channel which is the normal channel the remote uses for receiving communications. In FIG. 5 this communication is marked as arrow C. The new remote calculates if its desired signal is sufficiently strong to overcome any unwanted signals that are on the tentative channel. If the remote calculates that it can not use the tentative channel pair without interference at its own receiver, the new remote then proceeds to monitor other channel pairs.

Figure 10:
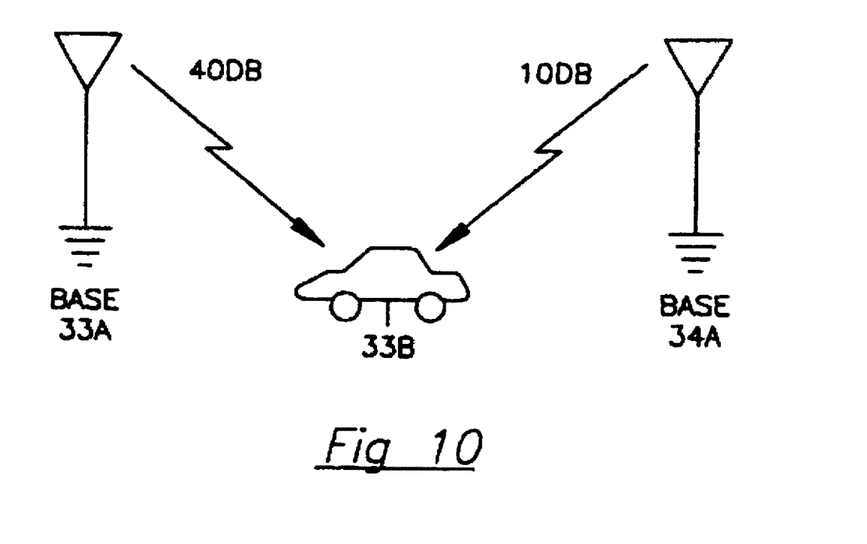
FIG. 10 is a drawing useful in explaining calculations for step 2 and step 3 of the inventive method.

As an example, refer to FIG. 10. Let us assume that the new remote 33B desiring communication heard a signal burst from a base site 33A at 40 db over threshold. During the quiet time, the new remote heard a 10 db over threshold signal coming from a distant base 34A. The new remote 33B calculates as follows:

40 db desired signal from proposed base 33A received at mobile 33B
−10 db undesired signal from base 34A 30 db difference in signal strengths This 30 db difference is larger than the 25 db required for good communications, and the remote 33B concludes that the previously assigned base 34A will not interfere with the proposed communications between base 33A and remote 33B at the receiver of remote 33B. If the remote 33B passes Step 2, then it proceeds to Step 3. If however, the remote 33B can not receive good communications, then the remote 33B begins to monitor the next channel.

Step 3. The third step is as follows. The new remote then listens to any undesired signals on the tentative channel pair.

If there are no undesired signals above threshold on the tentative channel pair, it proceeds to Step 4. The new remote already knows the undesired signal strength from step 2 above. The new remote then listens to the digital data stream code of the previously assigned base and calculates if the new remotes transmission would interfere with the base receiver previously assigned to that channel. This is accomplished by monitoring arrow C in FIG. 5. If its transmission would interfere with a previously assigned user on that channel, the new remote commences listening on another tentative channel. If the new remote passes step 3, then it proceeds to step 4. The calculations for this step are described below.

Refer to FIG. 10. Assume the new remote 33B hears a previously assigned base 34A at 10 db over threshold, and that the remote notes a signal strength code of 25 db in the transmission from base 34A.

| 10 db | over threshold is undesired signal |
| −6 db | remote 33B will transmit less power |
| 4 db | over threshold is undesired signal from remote 33B sent to base 34A |
| 25 db | is the desired signal at base 34A per signal strength code |
| −4 db | proposed signal |
| 21 db | difference |

Although this 21 db is close to the system goal for interference free communication, it is still not sufficient for good communications, so the new remote 33B concludes that it can not use the proposed channel pair without potentially disturbing or interfering with the previously assigned base site receiver 34A. Consequently, the new remote 33B commences to scan the channels again.

Step 4. The 4th step is as follows. The new remote next attempts to establish communication with his desired base on the tentative channel. This transmission is referred to as arrow D in FIG. 5. The new base calculates if the signal from the new remote is strong enough to insure good communications at the new base receiver. These calculations are similar to those performed in the previous steps. If the signal is strong enough, the base indicates that this base and the new remote have successfully found a channel, and communications are begun. If the desired base does not respond within a preselected time, perhaps because it can not successfully hear the new remote, the new remote then attempts another channel. If the new base hears the new remote, but calculates this signal difference not adequate, the new base does not respond.

Figure 11:
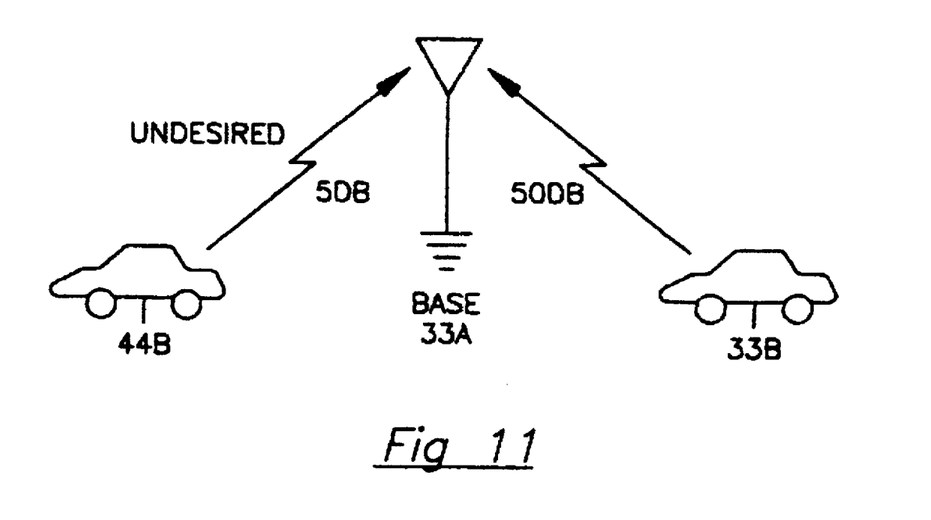
FIG. 11 is a drawing useful in explaining the calculations for step 4 of the inventive method.

As an example refer to FIG. 11. Assume the new base 33A hears unwanted signals at 5 db over threshold from remote 44B, and that the desired signal is arriving at 50 db over threshold from remote 33B.

| 50 db | desired signal |
| −5 db | of undesired signal |
| 45 db | of difference |

This 45 db of signal difference is sufficient such that the new base 33A will hear a good signal from the new remote 33B. The 45 db is substantially above the 25 db required for communications. Consequently, communications are commenced.

Refer to FIG. 5. The new base compares the signals on arrow A against the signal of path D. If there is only one undesired signal present, then the comparison is straight forward. When more than one undesired signal is present, the new base hears only the stronger one, and the results of the comparison are logically the same.

The above steps insure the establishment of a channel assignment that does not interfere with previously assigned user pairs, and insures that the new communications pair will also have interference free communications.

Figure 3:
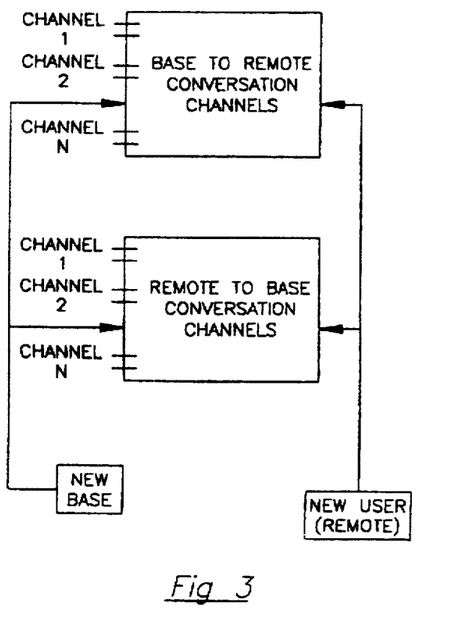
FIG. 3 is a drawing useful in explaining the frequency allocation plan for the inventive system and method.

FIG. 2 shows a frequency plan of U.S. Pat. No. 4,965,850. The new user and the new base must communicate both on a signaling channel and the proposed communications (conversation) channel in order to make an assignment. FIG. 3 shows a frequency plan for the present invention. The new user and the new base need only communicate on the proposed conversation channel and a signaling channel is not required. The elimination of the signaling channel simplifies the frequency allocation plan, and also increases the spectrum efficiency of the inventive system because spectrum is not wasted for a signaling channel. Also the hardware implementation is much simpler in that the communication need only occur on the proposed communication channel which simplifies the logic and the design of the remotes and the bases.

FIG. 4 shows the communication paths that must be utilized in order to assign an interference free channel in U.S. Pat. No. 4,965,850. FIG. 5 shows the communication paths that must be utilized in the inventive system and method in order to assign interference free channels in the present inventive system. Importantly, note that the new user pair need only monitor the previously assigned users, and need not communicate with them. This reduction in communication simplifies the logic, and also reduces the chances for error. Previously assigned users do not participate in the decision whether to add a new user to a specific channel.

A second embodiment of the present invention has application for communications wherein a base is preassigned to a particular remote. More specifically, the present invention has application to a keyboard to computer or computer to computer type systems. The present invention also has application for cordless telephone and wireless PBX systems.

Figure 12:
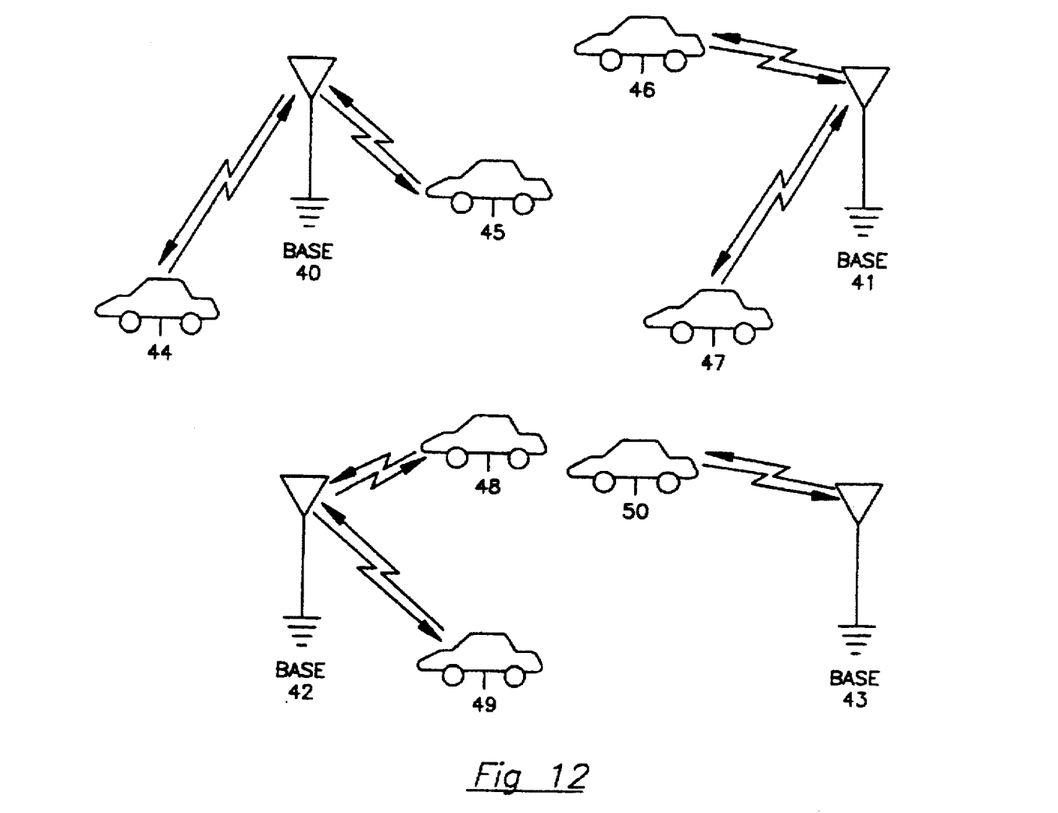
FIG. 12 is a drawing useful in explaining typical assignments in the first embodiment of the inventive method; and, FIG. 13 is a drawing useful in explaining typical assignments in the second embodiment of the inventive method.

There are two different types of decentralized systems known to the inventor. The first are decentralized systems where the remote users are normally assigned to the strongest or closest base. An example would be a telephone system where the user traveled around, and the system would select the closest base site when making a call. FIG. 12 shows assignment examples where users are assigned to the closest base. A second type of decentralized system is where remote users are preassigned to specific bases, and their desired base might not be the closest base to them. An example would be a cordless telephone user who takes his phone down the street, and yet desires to talk only to his own home base. See FIG. 13 for examples of assignments in systems where users are preassigned to specific bases.

In the telephone system where the user is assigned to the closest base there is an important preplanning consideration that is implied in the system design. At each base site a radio channel would only be used for a single conversation at one time. Unless directional antennas and sectoring were used, it is obvious that if a radio channel were used for two different conversations at the same base at the same time that interference would occur. Consequently, in systems where the remote user is assigned to the closest base, there is some central planning that has occured before the system is used. The method and system in U.S. Pat. No. 4,965,850 eliminates interference between different sites that would be using the same channels.

In the cordless telephone environment there is no central planning at all, and various consumers purchase cordless phones and install them without any central coordination of any kind.

These are two very different styles of organization. Refer again to FIG. 12 and FIG. 13. In the system were users are assigned to the closest base, there is a high degree of planning inherent in the system in that selected frequencies are not used more than once at a time at a given base site. Base sites would be spread out at various locations to cover a service area. An example of this kind of system would be a telephone system that provides service to a large metropolitan area. Base sites might be placed on a grid to insure geographic coverage of the entire area. FIG. 12 shows a grid of four different base sites supporting seven different conversations between seven mobiles 44–50 and four bases 40–43. Base sites would not be placed adjacent to each other, as that would serve no purpose. There would be no gain in system coverage, for example, to place two base sites each with multiple radios on a single telephone pole. Some of the systems being proposed for the upcoming personal radio telephone system in the U.S.A. envision a grid of base sites placed on telephone poles and such system operated by a telephone company. Some of the proposals indicate that preplanned cells such as in cellular radio would be used so that a given channel would not be used at an adjacent telephone pole site. The inherent assumption in this system design is that a channel would not be used more than once at any given time at any given site.

Figure 13:
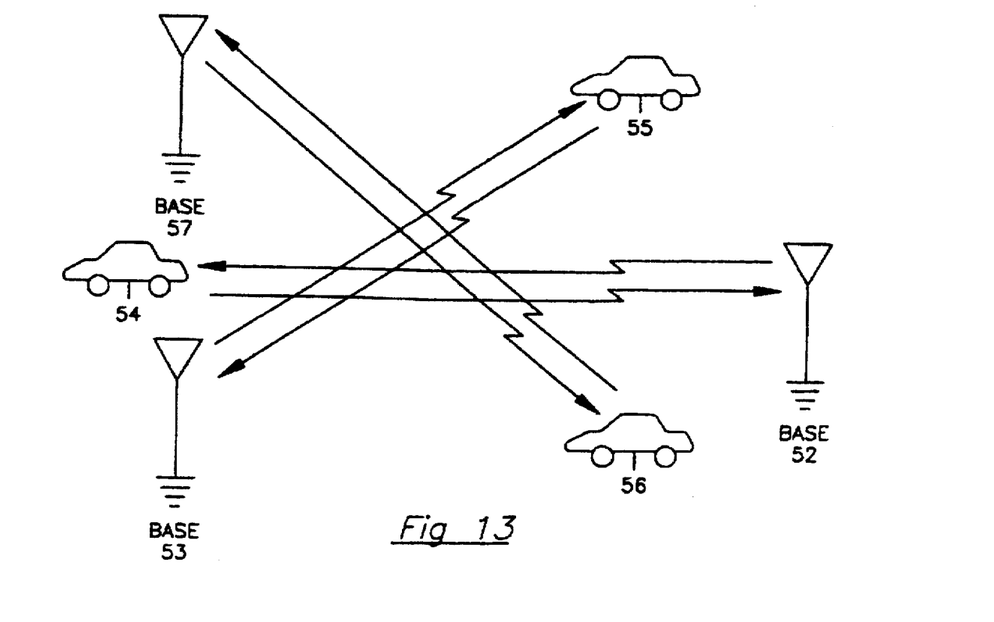

The decentralized system where users are pre-paired and desire to communicate only with a specific base is a very different kind of system problem. In this system there is no implied preplanning that prevents using a given channel more than once at any given time. Not only must the system prevent adjacent sites using the same channel, but the system must also prevent two sets of users who are essentially located at the same location from using the same channel simultaneously. FIG. 13 shows the relative disorganization that occurs in this system implementation with only three different conversations between mobiles 54–56 and three bases 52, 53, and 57.

The decentralized type of system where users are pre-paired and not necessarily assigned to the closest base is very prone to interference. In the cordless phone systems of today where a block of channels are created in a given band, there are two basic philosophies of operation. The first philosophy can be referred to as random seizure. In this mode, the cordless phone randomly selects a channel and begins operation. In the second philosophy, some monitoring occurs by the new user to select a channel. One method is to monitor a channel, and if the channel appears occupied, then another channel is attempted.

Both random seizure and monitoring in decentralized systems without the remote being assigned to the closest base are very prone to interference, and it has been found that the implementation of the present invention can significantly reduce interference. The results of a computer simulation comparing the results of these different approaches to channel selection is discussed later.

Another important example of this type of decentralized system is a computer user who disconnects his keyboard from his computer, and wants to talk only to his computer even though he might move about in a large office complex with other computers. An application of the present invention is found in large office buildings wherein many desks have their own work station computer. Radio or cordless communication enables computers to contact each other for data exchange without the necessity of wiring the building and pre-connecting all the computers. The present invention enables disconnecting of the keyboard from the computer, such that a worker could take the keyboard down the hall or down the elevator to a meeting, and yet still have access to his desktop computer and its important files and software. Various computers can share a common printer without detaching and attaching various printer cables.

Another application of the present invention is to provide each student in a classroom with a radio controlled terminal that would access a single computer in each classroom which would be much more cost efficient then providing each student with his or her own personal computer.

In either the school or office environment, the limited frequencies available for communications are small compared to the number of users that need to use such a system. Consequently, it is important that the frequencies be reused within a close proximity without a potential problem of interference. The present invention accomplishes the foregoing without a central controller, and the invention permits multiple systems to share the common frequency resource without interference. Multiple systems such as cordless keyboards, cordless PBXs, and school data entry devices could all share the same frequency resource without interference. The only requirement is that each system must add the signal strength code to their transmissions. Since two way communications are not required between users in different systems, different data rates and different types of information such as data and voice can coexist without interference caused by poor assignments.

Similarly, as described above, this embodiment of the invention provides improved keyboard to computer and computer to computer communication utilizing a duplex two-way communications which utilizes a two radio band approach. In the cordless keyboard approach, the computers all transmit on one band (the computer or "base" transmit band), and the keyboards all respond on the other band (the subordinate or "remote" transmit band). In a computer to computer and computer system approach, one computer is designated as master and it talks out on the base talk out band, and the other computers are designated as subordinates, and they talk on the subordinate or "remote" band.

It will be understood herein that the terms bases and remotes will also include communications between computer to computer, computer to keyboard, cordless phone base to cordless phone, and wireless PBX bases and their remote phones.

In the system described previously in this invention a remote user chooses any one of a number of potential base sites. In the present variation of the invention as applied to paired communications system the remotes are pre-assigned to selected bases and the remotes communicate only with specific preselected host base.

In this variation an unique ID is pre-assigned to all user pairs. Each remote will only communicate with one particular base. Obviously, the system can be reprogrammed to change the pairing if desired. But, at any one time, a remote can only communicate with one base.

Figure 6:
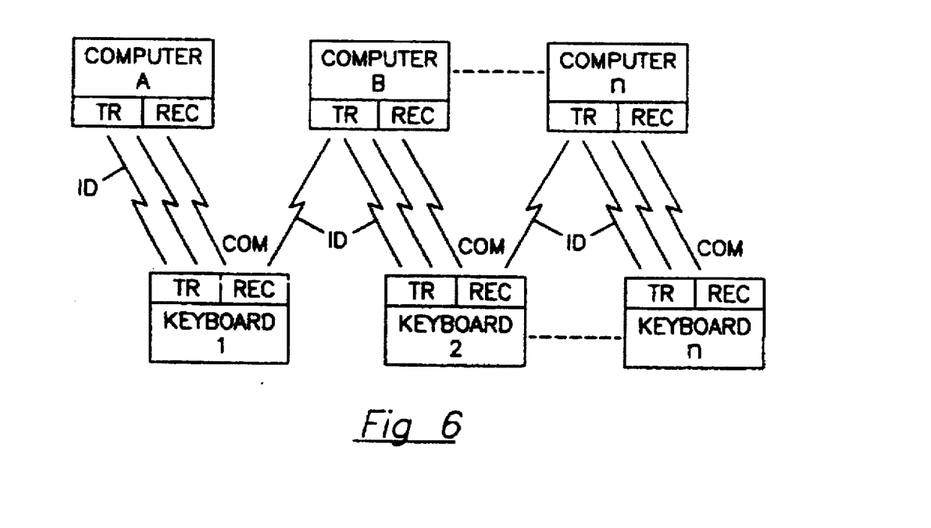
FIG. 6 is a drawing useful in explaining a second embodiment of the inventive system.

The sequence of the operation of the system will now be explained. In FIG. 6, the remotes are shown as keyboards 1, 2, . . . n, and the bases are shown as computers A, B,. . .n. The computers are continuously monitoring the various channel communications signal pairs, and searching for channels that appear to be open.

Step 1A. Referring to FIG. 6, the first step for assigning a computer to keyboard, computer to computer system, cordless phone system, or wireless PBX system wherein a particular remote is preassigned to a particular base is the same as described above as step 1 above.

Step 2A. The second step for assigning a particular remote to a preassigned base is as follows. The new remote listens on a variety of channels for his corresponding desired computer. If the new remote hears a signal ID that does not correspond with his desired ID, the remote ignores the transmission.

Step 3A. The new keyboard hears its desired ID on a tentative channel, it also notes the undesired signal strength on the tentative channel. The new keyboard then proceeds as in step 2 above.

Step 4A. The new keyboard then listens for any undesired signals on the tentative channel. The new keyboard proceeds as in step 3 above.

Step 5A. The new keyboard then attempts to establish communication with his desired base on the tentative channel. The procedure follows step 4 above.

The added step of searching for only desired users gives this system the ability to selectively communicate only with selected other users.

This procedure also would permit spectrum sharing between different kinds of users that do not share a common signaling scheme. For example, IBM compatible computers might use a unique network protocol to communicate with themselves, and (Apple) Macintosh computers would use a different protocol. These different protocols could be accomodated in the same radio spectrum without interference by only adding the signal strength code to each protocol. The Macintosh computers would not need to communicate with the IBM compatible computers to make frequency channel assignments.

The addition of the selective response function; that is, with the keyboards searching for a specific computer, to the four steps creates a system with frequency reuse such that the new user(keyboard or remote) might not necessarily be talking to the closest base. It is also true that no preplanned geographical separation of users is required for frequency reuse. This is true whether separation is miles in an urban area, or stories in a reinforced concrete building. Preplanned positions in the building based upon propagation needs are not required and bases and remotes can be positioned anywhere according to the convenience of the users. Further, remote users can contact a computer on a variety of channels, and assignments are made such that interference will not occur.

As an example of the operation of the system in a classroom environment, assume two different classrooms in the same building separated by concrete walls. Each of these classrooms is using the same frequencies for student terminals to access the teacher's computer. However, a student keyboard located by an open window has a line of sight propagation path to a computer located by a window in a second building. The present system would determine that this student terminal could not coexist on the same frequency as the other computer, and both systems would avoid making simultaneous assignments with those two users on the same channels.

As another example, two secretaries located in the same large room of a large office building, perhaps only separated by a row of metal filing cabinets, can reuse the same channel because their keyboards were located near their computers and each can capture their respective computers. However, another secretary who has taken her keyboard with her to another room for a meeting, and has a very weak signal, would automatically be assigned a clear channel.

Note that in certain systems, computers may desire to communicate with host computers, and such computers will need to be equipped with another set of radio transmitters and receivers with the frequency bands reversed. Note also that because of radio interference problems it is unlikely that a computer A will talk to another computer B while simultaneously talking to its keyboard A, since the transmitter A would probably interfere with the receiver that is listening to keyboard A.

A computer simulation of the technology described in this embodiment (decentralized environments where users are not necessarily assigned to the closest base, but instead are preassigned to selected bases) has been performed. This simulation taught that certain variables are very critical to the successful operation of this system. This computer simulation also showed the relative spectral efficiency of this system compared to other approaches for using the radio spectrum as explained below.

It is important to understand that this system organization permits the accidental introduction of a system problem frequently referred to as the "near/far problem".

Figure 7:
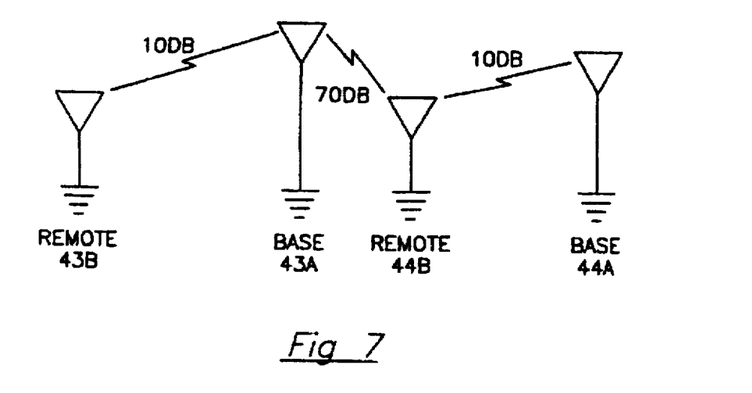
FIG. 7 is a drawing useful in explaining the "near far" problem.

This near/far problem can be understood by referring to FIG. 7. In this situation, remote 43B wants to talk to base 43A and is very far from base 43A. Remote 44B wants to talk to base 44A, but is very far from base 44A. Consequently, both desired signal paths are providing very weak signals. However, because base 43A is near remote 44B, the signal path between these two radios is very good, and a strong signal is received between these two radios.

One of the proposed techniques for increasing spectrum efficiency is the spread spectrum technology. It is known that in spread spectrum technology power control should be introduced to insure that all signals arriving at a receiver are near the same power level. If signals arrive at a receiver in spread spectrum technologies at widely divergent power levels, frequently, the strong signal swamps out the weaker signals. If the undesired signals are stronger than the desired signals, the desired signal gets swamped out.

In the cellular style system embodiments of U.S. Pat. No. 4,736,453 entitled Method and Apparatus for Making Frequency Channel Assignment in a Cellular or Non-cellular Radiotelephone Communications System, which issued on Apr. 5, 1988 to Gerald R. Schloemer, also the inventor of the present invention, power control can be installed at the mobiles to insure that their signals all arrive at the base site at the same power level. Power control need not be applied to the base talk out channels, as all signals arrive at the mobile at the same power level. Since users are normally assigned to the closest base, signals from other bases arrive at the mobile at even lower power levels. In the system embodiments of U.S. Pat. No. 4,965,850 cited above where users are also assigned to the closest base, a similar situation exists.

However, in this decentralized system of the second embodiment of the present invention, where users are not required or expected to talk to the closest base, the near/far problem can and does occur. To solve the near/far problem the method of channel assignment of the second embodiment of the present invention merely puts user pair 43A and 43B and user pair 44A and 44B on different channels and successful communication occurs.

As alluded to above, one of the technologies proposed for increasing spectral efficiency is spread spectrum technology. Although there are many different spread spectrum approaches, they all rely on intelligence in the receiver being able to select the desired communication from various unwanted communications. In a system organization, such as disclosed in the second embodiment of the present invention, where users are not necessarily assigned to the closest base, spread spectrum systems can not function without interference. Spread spectrum approaches need similiar power levels at a concerned receiver, and without a central intelligence or control, spread spectrum can not operate properly.

The relative spectrum efficiency of three different methods of assigning conventional channels has been considered.

| Random Seizure | Users acquire any channel |
|---|---|
| Monitor First | New base monitors for quiet channel |
| Inventive Method | Five step method |

A computer model was developed for an area 20 miles by 20 miles, and it was assumed that low antenna heights made maximum range of 10 miles. A 10 channel pair system was simulated. Although maximum radio range was up to 10 miles, users were assumed to be randomly placed within 1.5 miles of their desired bases. It was assumed that bases were randomly placed in this 400 square mile area. It was assumed that 15 db signal to interference ratios were required to have good communications.

The first step was to establish how many users could be on the air with random seizure. It was discovered that random seizure was very inefficient in that with only about 4 users on the air in this entire 400 square mile area that interference would become unacceptable (10% chance of dropped call). The fact this system with 10 channel pairs only permitted four users in this relatively large area, shows how spectrally inefficient random channel usage can be.

Next a system with the new base looking for a quiet channel was studied. It was found that if the base sets its monitoring level at 5 db over threshold that many weak signals will be heard and that channels are denied that would have permitted successful frequency reuse. However, if the base sets its monitoring level at 15 db over threshold, then it sometimes makes assignments that cause interference. The monitoring threshold is a very critical variable, and it was found that numbers between 5 db and 15 db optimize system performance. The simulation was performed with the optimized variable, and it was found that one could put 80 people on the same channels in the 400 square mile area. The increase from only 4 users to 80 users shows how important monitoring before usage can be to spectral efficiency.

Next, the method of the invention was simulated. It was assumed that 15 DB was required to capture, and the simulation was performed with a variety of safety factors. It was found that the safety factor was an important variable. With safety factors of 1 to 10 db added to the 15 db minimum, there was significant frequency reuse. With safety factors above 10 db there was not much frequency reuse. (In some systems where interference is the most important issue, safety factors of 10 to 30 db may be used.)

The comparative results for 10 channel pairs in a 400 square mile area with flat terrain were as follows:

| Random seizure: | 4 |
|---|---|
| Monitor before usage | 80 |
| Five tests per herein | 130 |

Another simulation was performed with geographical propagation anomalies caused by hills ranging from zero height to 100 feet high, and the efficiency of all approaches suffered. This simulation would compare to an area such as the Chicago area. The new results were:

| | |
|---|---|
| Random seizure: | 3 |
| Monitor before use | 15 |
| Five tests per herein | 45 |

In both of the above tables of simulation results the users were randomly located within 1.5 miles of their respective bases. This short range typically meant that users had good propagation to and from their bases, and that other users would be somewhat distant. In this situation, base monitoring before use is very effective compared to random entry and enhances capacity by factors from 5 to 20 to one. The five test technology typically doubles or triples system capacity again compared to base monitoring.

However, when mobiles (remotes) are permitted to range up to five miles from their respective bases, user pairs tend to overlap, and base monitoring is not as effective. The five test technology becomes very important. The following table is for a maximum user range of 5.0 miles in flat terrain.

| | |
|---|---|
| Random seizure | .5 |
| Monitor before use | 1 |
| Five tests per herein | 25 |

The above computer simulation results suggest different implementation strategies for different system configurations. Four different interference tests are required to make an interference free assignment as four different receivers are involved. Since each of the four receivers could be located at a different location, each receiver could hear an entirely different set of interfering signals with different signal strengths. Consequently, four different tests are required to make an interference free assignment. Monitoring and testing by a new (incoming) base typically only discloses whether that new base would receive interference. Monitoring and testing by the new mobile discloses whether the new mobile would receive interference. However, those two monitoring and testing situations do not disclose whether the new (incoming) user pair would interfere with an existing conversation. Testing should also be performed to determine if existing conversations would receive interference. Although a conservative design is to implement all four tests, sometimes due to various considerations only three of the four tests are implemented.

In the case where this technology is implemented where users are typically near or very near their bases, satisfactory results can be achieved with only three of the four tests. For example, in a cordless computer keyboard scenario where the keyboards are located very near their respective computers, user pairs do not typically overlap, and the individual four tests yield similar results. In this situation, three of the four tests need only be performed.

However, in a situation where a single building has many different people using Personal Digital Assistants (PDAs), and the users of these PDAs roam around the building, and are not always near their respective computers, the four interference tests tend to be statistically independent. Each of the four receivers hears a different interference profile, and the conservative strategy is to implement all four tests. Several different cordless PBXs working in the same area would also require the four different tests.

Naturally, on any given channel there could be a multitude of various users each who could interfere and be interfered with upon the entrance of a new user pair. Statistically, however, usually only one of those user pairs on any given channel is located such that a potential interference situation exists. Consequently, the four tests are performed with the strongest user. In those rare cases where two users are of approximately the same signal strength, their combination might not be decodeable. In those situations where combined signals from two existing users can not be decoded, one or more of the four tests might not be performed properly.

Additional Embodiments

The preferred embodiment described above provides an improved method for performing four dynamic S/I tests. It has been found that alternate embodiments of the invention can perform three of the S/I tests to provide the improve dynamic performance. These alternate embodiments have been found to be particularly useful in cases where it is necessary to shorten the time to make an assignment. Such alternative embodiments also provide cost reductions by eliminating equipment and programming.

As described above, the preferred embodiment performs the following four dynamic signal to interference tests. These tests utilized calculations to determine if each of four concerned receivers would have adequate signal strength to overcome unwanted signals. These tests are summarized as follows:

1. New base tests signal/interference at old remotes
2. New remote tests its own signal/interference
3. New remote tests signal/interference at old bases
4. New base tests its own signal/interference In the following four alternate embodiments, the three tests are performed in the sequence indicated above.

In a first alternate embodiment, test 1 above is simplified. In this first alternate embodiment, the new base looks for quiet channels, that is channels with less than 10 DB of signal. By using only quiet channels, the new base does not have to calculate or test whether it would interfere with previously assigned remotes. In this embodiment, the new bases only transmit their ID transmission on channels with received signal strength of less than 10 db. The other three tests remain the same. This embodiment takes less time to analyze a given channel, and also simplifies the functionality of the bases.

This first alternate embodiment does have the disadvantage that at times channels could be used that have undesired signals on them of slightly more than 10 DB. Computer simulations show that in heavily used systems, there frequently are many instances where distant users send signals which arrive at a greatly reduced signal strength, say 12 db, and successful frequency reuse can be accomplished.

In a second alternative embodiment of the invention test 2 is essentially eliminated. The new remote seeking to enter the system assumes that if it heard the desired base, it has sufficiently good received signal strength compared to the undesired signal strength, and that it will receive a good signal. Therefore, instead of performing the details of tests 2, the new remote assumes that, if it hears a good signal, it will have good communications with its desired base. The other three tests remain the same.

This second alternate embodiment has been found to have certain restrictions. In the preferred embodiment, a safety factor is added that compensates for time varying signals. In this second alternate embodiment, no such safety factor is added, and the new remote may move slightly geographically and enter a location with interference because there is no safety factor. In the preferred embodiment 25 DB separation between desired and undesired signal is required to make an assignment. Since only about 15 DB signal to interference separation permits the new remote to initially hear a good signal, this alternate embodiment removes 10 db of safety factor.

In the third alternative embodiment, test 3 is eliminated. The new remote does not consider the impact it will have on the previously assigned bases. The new remote does not test whether its signal would interfere with any ongoing communications. The new remote only determines that it will in fact receive a good signal as a result of test 2. The new remote does not perform test 3. All other tests are the same. This embodiment greatly simplifies the functionality of the remotes in the system; that is, remotes do not have to decode ongoing communications and remotes do not have to perform the associated calculations.

In the third alternate embodiment, new remotes can enter the system, and cause interference to previously assigned users. Consequently, this alternate embodiment is principally utilized in systems where remotes are near their desired bases.

In the fourth alternate embodiment, test four is eliminated. The first three tests are performed as in the preferred embodiment. However, in this alternate embodiment when the new base hears the new remote, the new base assumes that, if it hears the new remote, it has received a signal of sufficient strength from the remote, and does not perform test 4.

In this fourth alternate embodiment, the new remote or the old remotes might move slightly geographically, and interference may occur. There is no safety factor built into this alternate embodiment. However, this alternate embodiment is useful in computer to computer applications where messages tend to be of short duration and movement is not a problem.

While the invention has been particularly shown and described with reference to a preferred embodiment thereof, it will be understood by those skilled in the art that various changes in form and details may be made therein without departing from the spirit and scope of the invention.

I claim:

1. A method for making communications channel assignments in a radio communications system comprising a plurality of bases each including transmitter and receiver means operable in a plurality of communication channels, said system including a plurality of remote units (remotes) each having transmitter and receiver means which are selectively assigned to operate in said plurality of channels; said method including the steps of:

a. making said communication channel assignments for incoming remotes, each of which incoming remotes desires to communicate with a respective proposed base over said system communication channels, depending on real time signal comparisons without use of a central channel assignment control;

b. conducting the following interference determinations before making a communications channel assignment to an incoming remote: 1) determining whether said proposed base for said incoming remote will cause interference at a previously assigned remote already operating in said system communication channels, 2) determining whether said incoming remote will be interfered with by a previously assigned base already operating in said system communication channels, 3) determining whether said proposed base for said incoming remote will be interfered with by a previously assigned remote, and 4) determining whether said incoming remote will cause interference at a previously assigned base; and, c. signaling only between said incoming remote and said proposed base to make said interference determinations to make a communications channel assignment in said system for said incoming remote and said proposed base.

2. A method as in claim 1 wherein after said signaling step, all of said four interference determinations are made before making a channel assignment to an incoming remote.

3. A method as in claim 1 further including the steps of:

a) designating selected bases and remotes as pairs, with and b) permitting only said designated pairs of bases and remotes to communicate with one another.

4. A method for making communications channel assignments in a radio communications system comprising a plurality of bases each including transmitter and receiver means operable in a plurality of communication channels, said system including a plurality of remote units (remotes) each having transmitter and receiver means which are selectively assigned to operate in said plurality of channels; said method including the steps of:

a. making said channel assignments for incoming remotes, each of Which remotes desires to communicate with a respective proposed base over said system communication channels, depending on real time signal comparisons without use of a central channel assignment control;

b. conducting at least three of the following four interference determinations before making a channel assignment to an incoming remote: 1) determining whether said proposed base for said incoming remote will cause interference at a previously assigned remote already operating in said system communication channels, 2) determining whether said incoming remote will be interfered with by a previously assigned base already operating in said system communication channels, 3) determining whether said proposed base for said incoming remote will be interfered with by a previously assigned remote, and 4) determining whether said incoming remote will cause interference at a previously assigned base; and, c. signaling only on communications channels to make said interference determinations to make a communications channel assignment in said system for said incoming remote and said proposed base;

whereby said system requires no signaling channels to make communications channel assignments.

5. A method as in claim 4 wherein after said signaling step, all of the four interference determinations are made before making a channel assignment to an incoming remote.

6. A method as in claim 4 further including the steps of:

a) designating selected bases and remotes as pairs, and b) permitting only said designated pairs of bases and remotes to communicate with one another.

7. A method for making communications channel assignments in a radio communications system comprising a plurality of bases each including transmitter and receiver means operable in a plurality of communication channels, said system including a plurality of remote units (remotes) each having transmitter and receiver means which are selectively assigned to operate in said plurality of channels; said method including the steps of:

a. making said communications channel assignments for incoming remotes, each of which remotes desires to communicate with a respective proposed base over said system communication channels, depending on real time signal comparisons without use of a central channel assignment control;

b. conducting desired signal to undesired signal comparisons to obtain interference determinations between selected remotes and bases in the system before making a communications channel assignment to an incoming remote;

c. signaling only on communications channels to make said interference determinations to make a communications channel assignment in said system for said incoming remote and said proposed base, whereby said system requires no signaling channels to make communications channel assignments.

8. A method as in claim 7 further including the steps of:
a) designating selected bases and remotes as pairs, and
b) permitting only said designated pairs of bases and remotes to communicate with one another.

9. A method as in claim 7 including the step of:

signaling only between said incoming remote and said proposed base to make said interference determinations to make a communications channel assignment in said system for said incoming remote and said proposed base.

* * * * *